(12) United States Patent
Kaneko

(10) Patent No.: US 7,881,162 B2
(45) Date of Patent: Feb. 1, 2011

(54) INFORMATION PROCESSING APPARATUS AND READING CONTROL METHOD

(75) Inventor: Yoshihiro Kaneko, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 345 days.

(21) Appl. No.: 12/195,767

(22) Filed: Aug. 21, 2008

(65) Prior Publication Data

US 2009/0109804 A1    Apr. 30, 2009

(30) Foreign Application Priority Data

Oct. 31, 2007    (JP) .............................. 2007-284422

(51) Int. Cl.
*G11B 7/004* (2006.01)
(52) U.S. Cl. ................. 369/30.23; 369/47.32; 369/47.4
(58) Field of Classification Search ........................ None
See application file for complete search history.

(56) References Cited

FOREIGN PATENT DOCUMENTS

| JP | 06-153156 | 5/1994 |
|---|---|---|
| JP | 06-165125 | 6/1994 |
| JP | 08-115566 | 5/1996 |
| JP | 09-097135 | 4/1997 |
| JP | 2002-025179 | 1/2002 |
| JP | 2002-288927 | 10/2002 |
| JP | 2006-244669 | 9/2006 |
| JP | 2007-128286 | 5/2007 |
| JP | 2007-226963 | 9/2007 |

OTHER PUBLICATIONS

Machine translation of JP 09-097135A into English; Wada.*
Japanese Office Action dated. Feb. 10, 2009 for Appln. No. 2007-284422.

* cited by examiner

*Primary Examiner*—Wayne R Young
*Assistant Examiner*—Brian Butcher
(74) *Attorney, Agent, or Firm*—Pillsbury Winthrop Shaw Pittman, LLP

(57) ABSTRACT

According to one embodiment, an information processing apparatus, has a reading unit which, if a transfer delay address is found, stores data in the transfer delay address, in a memory, and stores data in a range from the transfer delay address to an additional address located at an outer periphery in a certain distance and which, if the address to be read on the optical disc is present in the transfer delay address, reads data corresponding to the address to be read as stored in the memory, and a control unit which, if the address to be read on the optical disc is present in the additional address, reads the data corresponding to the address to be read as stored in the memory, by the reading unit, and increases a rotation rate of the optical disc up to a predetermined number of revolutions.

4 Claims, 5 Drawing Sheets

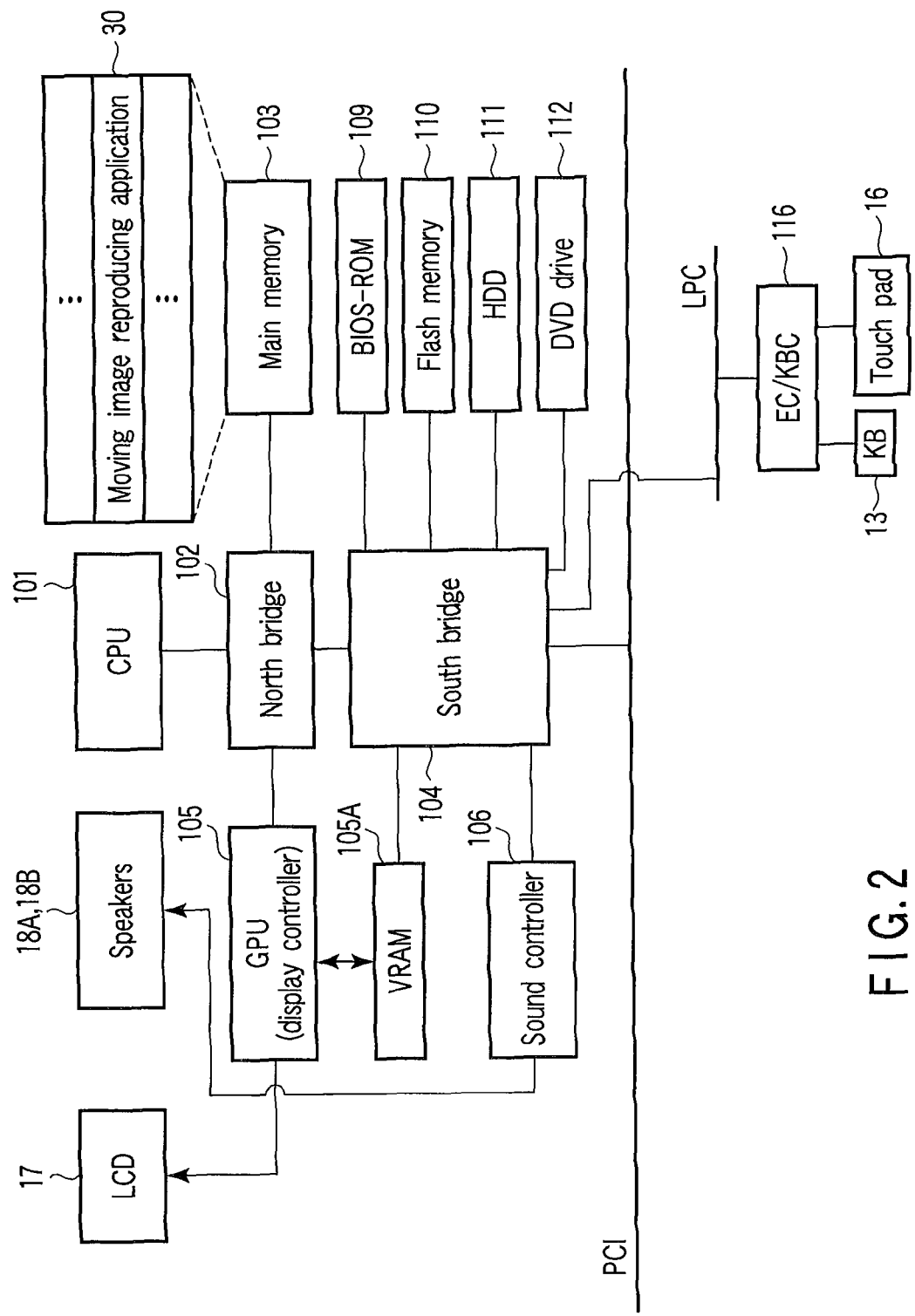
F I G. 2

INFORMATION PROCESSING APPARATUS AND READING CONTROL METHOD

CROSS-REFERENCE TO RELATED APPLICATIONS

This application is based upon and claims the benefit of priority from Japanese Patent Application No. 2007-284422, filed Oct. 31, 2007, the entire contents of which are incorporated herein by reference.

BACKGROUND

1. Field

One embodiment of the present invention relates to an information processing apparatus such as a personal computer and, more particularly, to an information processing apparatus comprising a high-speed reading function of optical discs and a reading control method.

2. Description of the Related Art

In general, there is an optical disc drive technology employing CAV (Constant Angular Velocity) system of making a reading speed lower at an inner periphery and higher at an outer periphery, in an optical disc drive used for personal computers and the like.

However, the technology disclosed in Jpn. Pat. Appln. KOKAI Publication No. 2007-226963 has a problem that in a response to the request for transfer from an application which is slower in reading speed at an inner periphery of an optical disc and which is required a high transfer rate of the reproduction of moving images, the transfer rate cannot be made higher and the frame drop of the moving images thereby occurs.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing a system configuration of the computer according to the embodiment of the present invention;

DETAILED DESCRIPTION

Various embodiments according to the invention will be described hereinafter with reference to the accompanying drawings. In general, according to one embodiment of the invention, an information processing apparatus, includes: an optical disc drive; a memory; a measuring unit which measures a data transfer rate of the optical disc if an optical disc is inserted into the optical disc drive; a calculating unit which calculates presence/absence of a transfer delay address on the optical disc where transfer delay may occur at a data transfer rate required of the optical disc by an application capable of accessing the optical disc drive, in accordance with the data transfer rate of the optical disc; a reading unit which, if the transfer delay address is found, stores data in the transfer delay address, in the memory, and stores data in a range from the transfer delay address to an additional address located at an outer periphery in a certain distance and which, if the address to be read on the optical disc is present in the transfer delay address, reads data corresponding to the address to be read as stored in the memory; and a control unit which, if the address to be read on the optical disc is present in the additional address, reads the data corresponding to the address to be read as stored in the memory, by the reading unit, and increases a rotation rate of the optical disc up to a predetermined number of revolutions.

An embodiment of the present invention will be explained below with reference to the accompanying drawings.

First, a configuration of an information processing apparatus according to the embodiment of the present invention is described with reference to FIG. 1 and FIG. 2. The information processing apparatus is implemented as, for example, a notebook-type personal computer 10.

Figure 1:
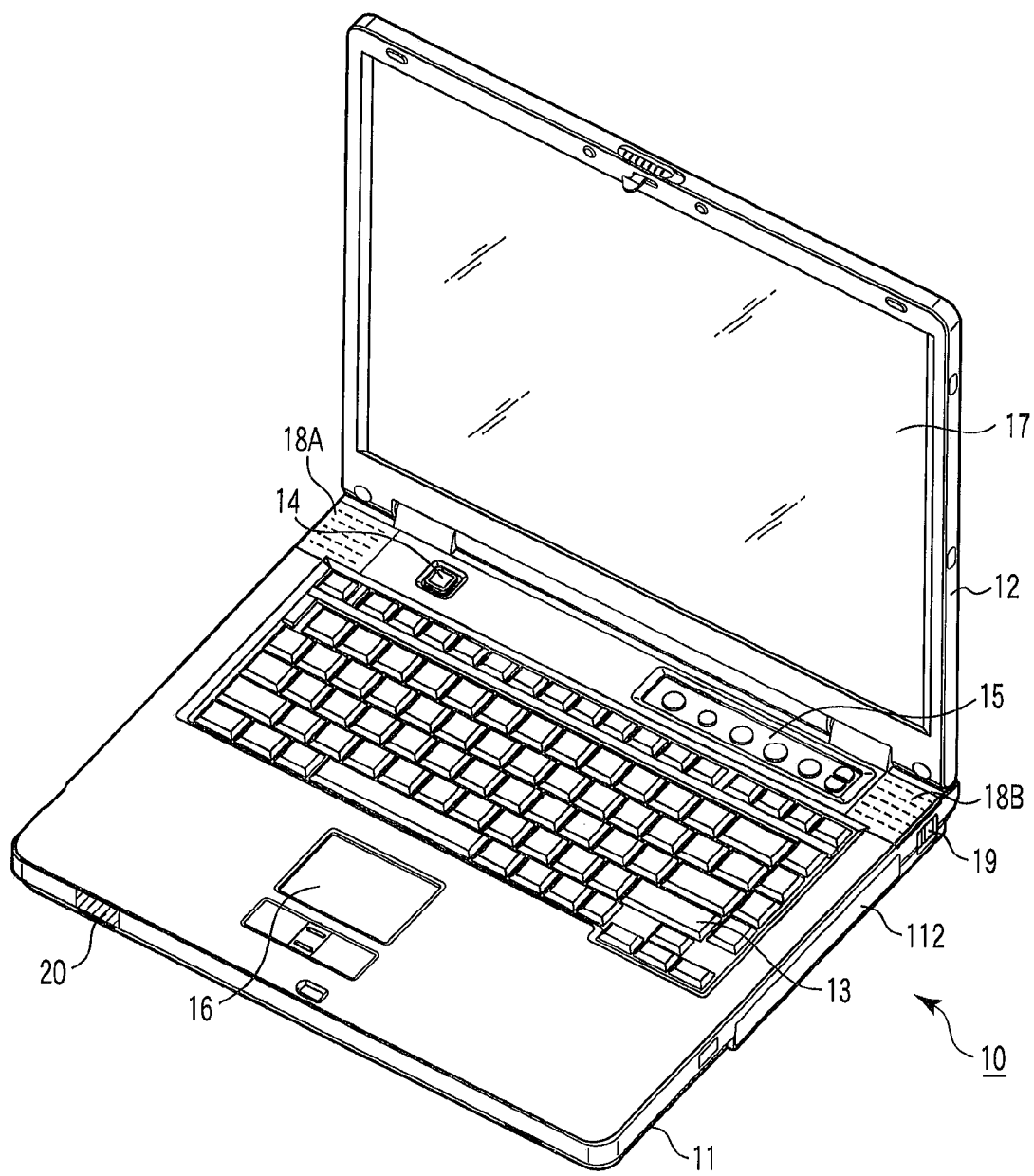
FIG. 1 is an exemplary illustration showing an outer appearance of a computer according to an embodiment of the present invention.

FIG. 1 is a perspective view showing the notebook-type personal computer 10 with a display unit thereof opened. The computer 10 comprises a computer main body 11 and a display unit 12. A display device composed of a TFT-LCD (Thin Film Transistor Liquid Crystal Display) 17 is embedded in the display unit 12. A display screen of the LCD 17 is located at a substantial central position of the display unit 12.

The display unit 12 is attached to the main body 11 so as to freely pivot between an opened position and a closed position. The computer main body 11 has a housing shaped in a thin box, and comprises a keyboard 13, a power button 14 for power-on/power-off of the computer 10, an input operation panel 15, a touch pad 16, speakers 18A, 18B, a DVD drive 112, an infra-red reception unit 20 and the like on the top face.

The input operation panel 15 is an input unit which inputs an event corresponding to a pushed button, and comprises a plurality of buttons for activating a plurality of functions.

Next, a system configuration of the computer 10 is described with reference to FIG. 2.

As shown in FIG. 2, the computer 10 comprises a CPU 101, a north bridge 102, a main memory 103, a south bridge 104, a GPU 105, a BIOS-ROM 109, a flash memory 110, a hard disk drive (HDD) 111, a DVD drive 112, an embedded controller/keyboard controller IC (EC/KBC) 116, an Internet connection unit 31 and the like. The DVD drive 112 is an optical disc drive employing a CAV (Constant Angular Velocity) system in which the data transfer rate in the outer periphery is higher than that in the inner periphery. In addition, the data transfer rate of the flash memory 110 is higher than that of the DVD drive 112.

The CPU 101 is a processor which controls the operations of the computer 10. The CPU 101 executes the operating system, a moving image reproducing application 30 for reproduction of DVD and the like loaded on the main memory 103 by the hard disk drive (HDD) 111. The CPU 101 also executes the BIOS (Basic Input Output System) stored in the BIOS-ROM 109. The BIOS is a program for the hardware control.

The north bridge 102 is a bridge device which makes a connection between a local bus of the CPU 101 and the south bridge 104. A memory controller which controls an access of the main memory 103 is also built in the north bridge 102. The north bridge 102 also has a function of executing communications with the GPU 105 via a serial bus based on the PCI Express standard, or the like.

The GPU 105 is a display controller which controls the LCD 17 employed as a display monitor of the computer 10. A display signal generated by the GPU 105 is transmitted to the LCD 17.

The south bridge 104 controls each device on an LPC (Low Pin Count) bus and each device on a PCI (Peripheral Component Interconnect) bus. In addition, an IDE (Integrated Drive Electronics) controller for controlling the HDD 111 is built in the south bridge 104.

The embedded controller/keyboard controller IC (EC/KBC) 116 is a one-chip microcomputer on which an embedded controller for power supply management, and a keyboard controller for controlling the keyboard (KB) 13 and the touch pad 16 are integrated. The embedded controller/keyboard controller IC (EC/KBC) 116 has a function of power-on/power-off of the computer 10, in accordance with the user's operation of the power button 14.

Figure 3:
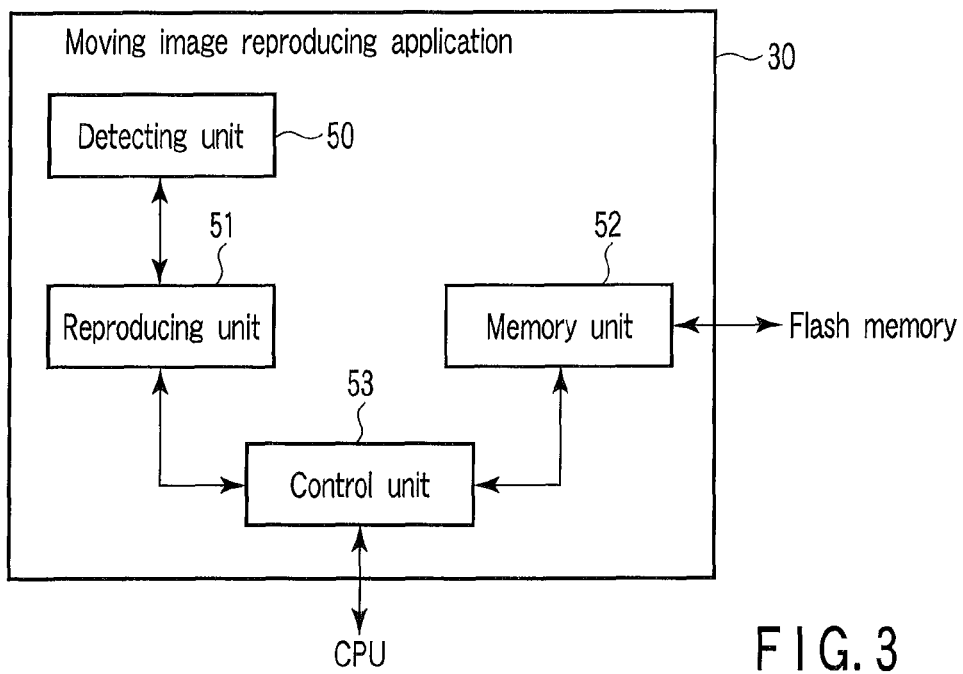
FIG. 3 is an exemplary block diagram showing a functional configuration of a moving image reproducing application according to the embodiment of the present invention.

Next, FIG. 3 is a block diagram showing a functional configuration of the moving image reproducing application according to the embodiment of the information processing apparatus of the present invention.

The moving image reproducing application 30 comprises a detecting unit 50, a reproducing unit 51, a memory unit 52 and a control unit 53.

The detecting unit 50 measures the data transfer rate of the optical disc when the optical disc is inserted into the DVD drive 112. On the basis of the data transfer rate of the optical disc, the detecting unit 50 calculates presence/absence of a transfer delay address on the optical disc where transfer delay may occur at the data transfer rate required to the optical disc by the moving image reproducing application 30.

The reproducing unit 51 decodes and reproduces the moving image data received from the DVD drive 112 and the like. The memory unit 52 stores the data inside the transfer delay address if the transfer delay address is found. The memory unit 52 also stores the data from the transfer delay address up to an additional address located at an outer periphery in a certain distance.

If an address to be read on the optical disc is in transfer delay addresses, the control unit 53 reads the data corresponding to the address to be read as stored in the flash memory 110. If an address to be read on the optical disc is in additional addresses, the control unit 53 executes a process of reading the data corresponding to the address to be read as stored in an area reserved on the main memory 103 or the flash memory 110, and increasing the rotation speed of the optical disc up to a predetermined number of revolutions.

Figure 4:
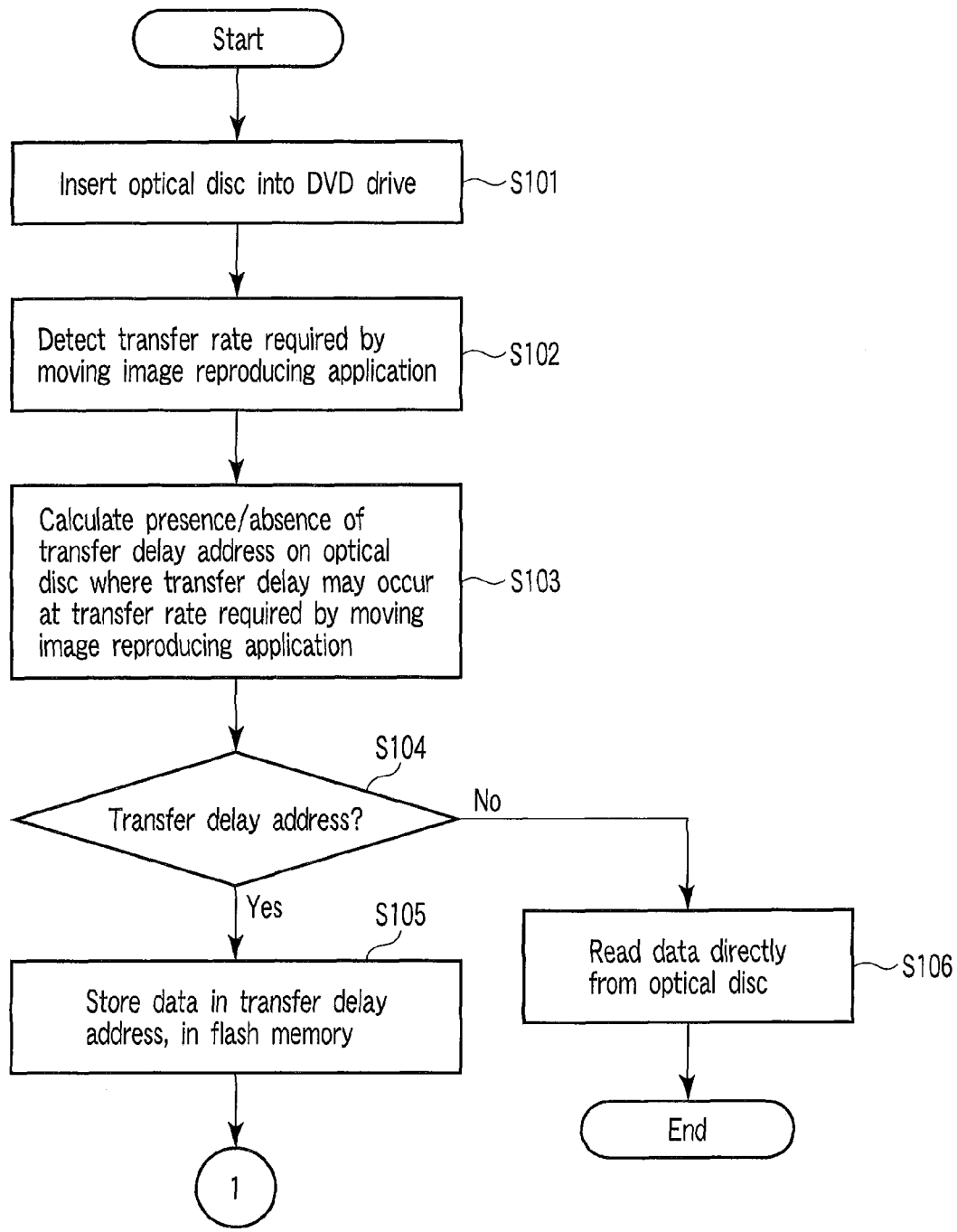
FIG. 4 is an exemplary flowchart showing a reading control method to which the computer according to the embodiment of the present invention is applied.
Figure 5:
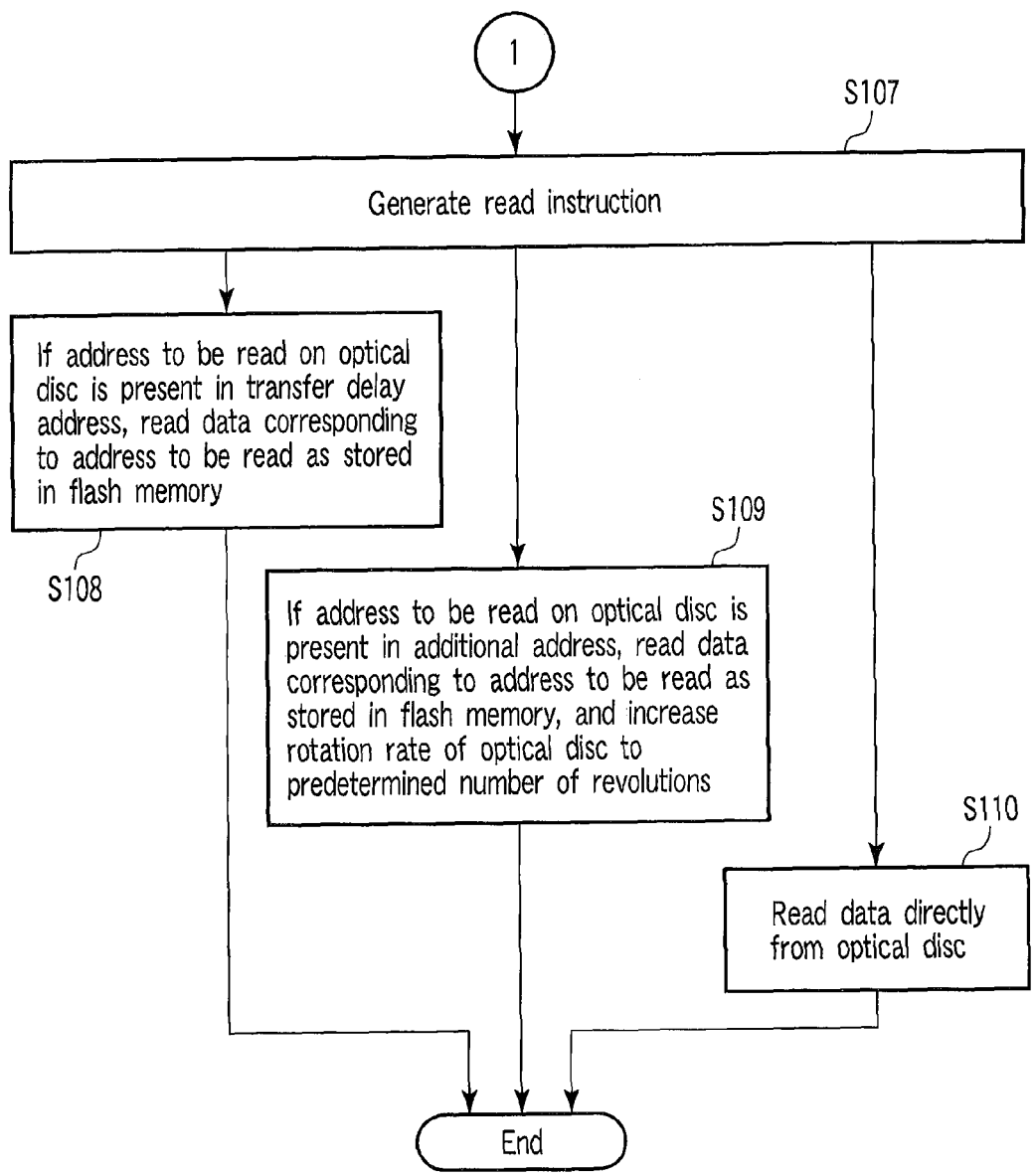
FIG. 5 is an exemplary flowchart showing a reading control method to which the computer according to the embodiment of the present invention is applied.

Next, a read control method to which an information processing apparatus according to the embodiment of the present invention is applied is described with reference to a flowchart of FIG. 4 and FIG. 5.

Figure 6:
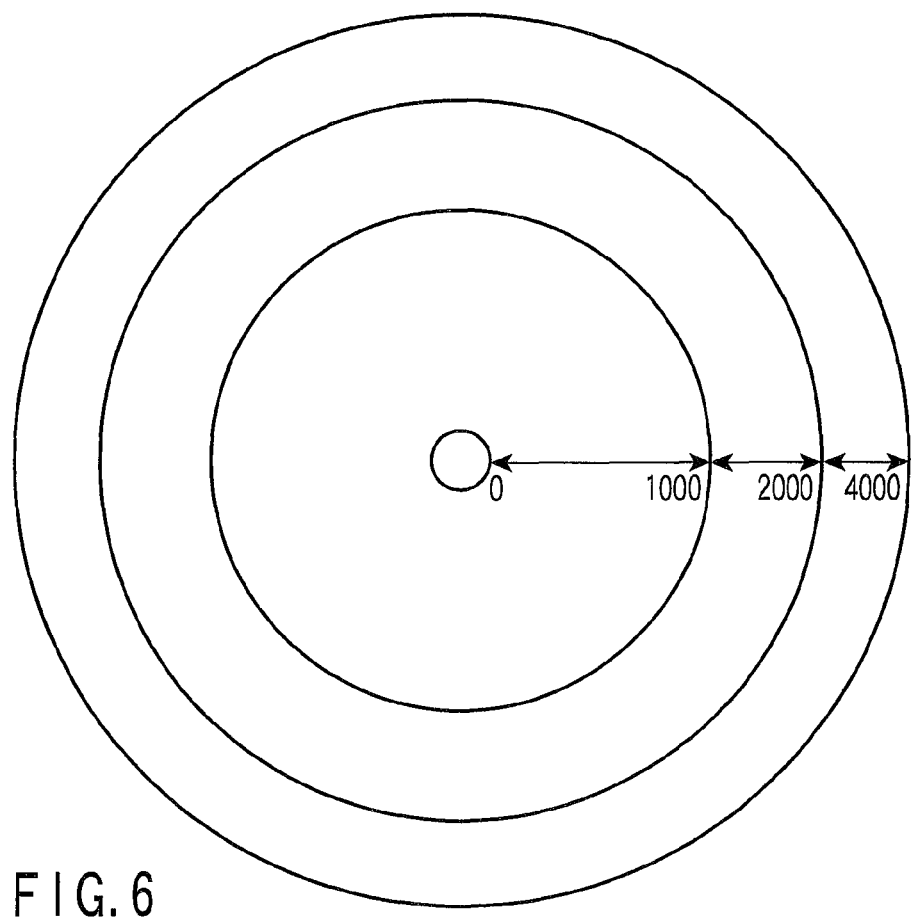
FIG. 6 is an exemplary illustration showing an idea of an address value of an optical disc.

A concept of the addresses on the optical disc is illustrated in FIG. 6. For example, delayed address values are set as addresses 0 to 1000 in an inner peripheral area, delay-prevention-added addresses are set as, for example, addresses 1000 to 2000, and an area outside the delay-prevention-added addresses (undelayed area: area read directly from the optical disc) is set as, for example, addresses 2000 to 4000. This address calculation is executed in Block S203 to be described later.

When the optical disc is inserted into the DVD drive (Block S101), the moving image reproducing application 30 of the computer 10 detects the transfer rate required by the moving image reproducing application 30 (Block S102). For example, the moving image reproducing application 30 detects a 10× speed as DVD reproduction or fast-feed transfer. The user, DVD player or the like notifies a file reading function (file system driver or the like) of the drive of a required read transfer rate for media such as DVD or the like, and sets the required read transfer rate.

Next, the moving image reproducing application 30 of the computer 10 calculates presence/absence of the transfer delay address on the optical disc where the transfer delay may occur at the transfer rate required by the moving image reproducing application 30 (Block S103). The moving image reproducing application 30 obtains the address values (0 to maximum number of sectors) on the optical disc at which the designated transfer speed can be preserved, from the transfer-responsive rate of the optical disc, and the transfer rate of the DVD drive 112 required of the optical disc by the moving image reproducing application 30. The delayed address values are set as addresses 0 to 1000 in the inner peripheral area, the delay-prevention-added addresses are set as, for example, addresses 1000 to 2000, and the area outside the delay-prevention-added addresses (undelayed area) is set as, for example, addresses 2000 to 4000.

If the moving image reproducing application 30 of the computer 10 calculates the absence of the transfer delay address on the optical disc where the transfer delay may occur at the transfer rate required by the moving image reproducing application 30 (NO in Block S104), the moving image reproducing application 30 reads the data directly from the optical disc (Block S106). In other words, if the obtained address value is 0, the moving image reproducing application 30 reads the data directly from the media for each address since the designated reading transfer rate can be obtained directly from the disc.

On the other hand, if the transfer delay address on the optical disc where the transfer delay may occur at the transfer rate required by the moving image reproducing application 30 is found by the moving image reproducing application 30 of the computer 10 (YES in Block S104), the data in the transfer-delayed address is stored in the flash memory 110 (Block S105). In other words, if there is an address value at which the data transfer rate is delayed (1 to maximum sectors), the data in the range to the address value of the delayed data transfer rate (for example, address 1000: cf. FIG. 6) and the additional address value (for example, 2000: cf. FIG. 6) to prevent the read delay at the time of direct reading from the DVD drive 112 is stored in the flash memory 110. The flash memory 110 may be a device having a higher transfer rate than the DVD drive 112, and is not limited particularly.

A read instruction occurs from the moving image reproducing application 30 by the reproduction of the DVD or the like (Block S107).

If a request for reading the data in the optical disc is made and the address to be read in the optical disc is present within the address value range where the transfer delay occurs, the moving image reproducing application 30 refers to the address data stored in the flash memory 110 and responds thereto as the data for the read request (Block S108).

On the other hand, if a request for reading the data in the optical disc is made and the address to be read in the optical disc is present within the delay-prevention-added address value range (for example, addresses 1000 to 2000: cf. FIG. 6), the moving image reproducing application 30 refers to the address data stored in the flash memory 110 and responds thereto as the data for the read request (Block S109). Simultaneously, to prevent the read delay to the disc, the moving image reproducing application 30 generates the read instruction to the address in the disc (within the delay-prevention-added address value range) to urge reading to be executed and increases the rotation of the drive up to a predetermined number of revolution in preparation for referring the data directly from the disc.

If a request for reading the data in the optical disc is made and the address to be read exceeds the address stored in the flash memory 110, the moving image reproducing application 30 executes reading data from the disc and responds thereto as the data for the read request since the read delay does not occur at the direct reading from the disc (Block S110).

As a modified embodiment, to prevent the read delay in preparation for random access to the address in the optical disc, the rotation of the disc can be increased in preparation for referring to the data directly from the disc by issuing the read instruction to the delay-prevention-added address value at any time.

The object of the present invention is to provide an information processing apparatus and reading control method, capable of reading data at a high speed, at an optical disc drive having a higher reading speed at an outer periphery than that at an inner periphery.

As described above, when the read transfer of a higher speed than the read transfer rate of the optical disc is requested, the data transfer rate is insufficient. Therefore, high-speed reading can be implemented by storing the data of the delay address area in the flash memory or the like. In other words, reading the data at a high speed can be executed at the optical disc drive where the read rate at the outer periphery is higher than that at the inner periphery.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   an optical disc drive;
   a memory;
   an application configured to be able to access the optical disc drive;
   a measuring module configured to measure a data transfer rate of the optical disc when an optical disc is inserted into the optical disc drive;
   a calculating module configured to calculate presence/absence of a transfer delay address on the optical disc where transfer delay may occur at a data transfer rate required of the optical disc by the application, in accordance with the data transfer rate of the optical disc;
   a first storing module configured to store data in the transfer delay address into the memory when the transfer delay address is found;
   a second storing module configured to store data in a range from the transfer delay address to an additional address located at an outer periphery in a certain distance;
   a reading module configured to read data corresponding to an address to be read on the optical disc and stored in the memory when the address to be read is present in the transfer delay address; and
   a control module configured to read the data corresponding to an address to be read on the optical disc and stored in the memory and to increase a rotation rate of the optical disc up to a predetermined rotation rate in preparation for reading, from the optical disc, data other than the data stored in the memory, when the address to be read is present in the additional address,
   wherein an data corresponding to the address to be read is read directly from the optical disc when the address to be read on the optical disc is present outside the additional address.

2. The apparatus according to claim 1, wherein a request for reading the optical disc is generated at any time for an address in the additional address to make the rotation rate of the optical disc increased up to the predetermined rotation rate.

3. A read control method employed in an information processing apparatus comprising an optical disc drive, a memory, and an application capable of accessing the optical disc drive, the method comprising:
   measuring a data transfer rate of the optical disc when an optical disc is inserted into the optical disc drive;
   calculating presence/absence of a transfer delay address on the optical disc where transfer delay may occur at a data transfer rate required of the optical disc by the application, in accordance with the data transfer rate of the optical disc;
   storing data in the transfer delay address in the memory when the transfer delay address is found;
   storing data in a range from the transfer delay address to an additional address located at an outer periphery in a certain distance, in the memory;
   reading data corresponding to an address to be read and stored in the memory when the address to be read on the optical disc is present in the transfer delay address;
   reading data corresponding to an address to be read and stored in the memory and increasing a rotation rate of the optical disc up to a predetermined rotation rate in preparation for reading, from the optical disc, data data other than the data stored in the memory, when the address to be read is present in the additional address; and
   directly reading, from the optical disc, the data corresponding to the address to be read when the address to be read on the optical disc is present outside the additional address.

4. The method according to claim 3, wherein a request for reading the optical disc is generated at any time for an address in the additional address to make the rotation rate of the optical disc increased up to the predetermined rotation rate.

* * * * *